United States Patent [19]

Liautaud et al.

[11] Patent Number: 4,558,270

[45] Date of Patent: Dec. 10, 1985

[54] BATTERY CHARGING ADAPTER FOR A BATTERY CHARGER FOR A PORTABLE BATTERY OPERATED TRANSCEIVER

[75] Inventors: James P. Liautaud, River and Bluff Rds., Trout Valley, Cary, Ill. 60013; Peter F. Stultz, Elgin, Ill.; David L. Maloney, Barrington, Ill.; John K. Westberg, II, Elgin, Ill.

[73] Assignee: James P. Liautaud, Cary, Ill.

[21] Appl. No.: 529,859

[22] Filed: Sep. 6, 1983

[51] Int. Cl.⁴ .................... H02J 7/00; H01M 10/46
[52] U.S. Cl. ............................................ 320/2; 455/90
[58] Field of Search .................... 320/2, 5, 13, 14; 455/89, 90

[56] References Cited

U.S. PATENT DOCUMENTS 3,659,180  4/1972  Urbush ................................. 320/2
4,229,686 10/1980  Mullersman et al. ................. 320/2

FOREIGN PATENT DOCUMENTS 2702129  7/1978  Fed. Rep. of Germany ......... 320/2

Primary Examiner—R. J. Hickey
Attorney, Agent, or Firm—Lockwood, Alex, FitzGibbon & Cummings

[57] ABSTRACT

A battery charger system for supplying charging current to either a battery-powered transceiver or to the rechargeable battery pack of the transceiver includes a housing housing a receptacle for receiving the transceiver. Upon insertion of the transceiver into the receptacle an electric contact projecting from the bottom wall of the receptacle contacts the transceiver to establish electrical communication between the device and charging circuitry within the housing. When supplying charging current to the battery pack an adapter having a smaller receptacle is inserted into the receptacle to establish electrical communication between the contacts and the battery pack. A reciprocatively mounted actuator stem in the adapter housing enables actuation of a deep-discharge mode select switch through an aperture in the bottom wall of the receptacle.

20 Claims, 10 Drawing Figures

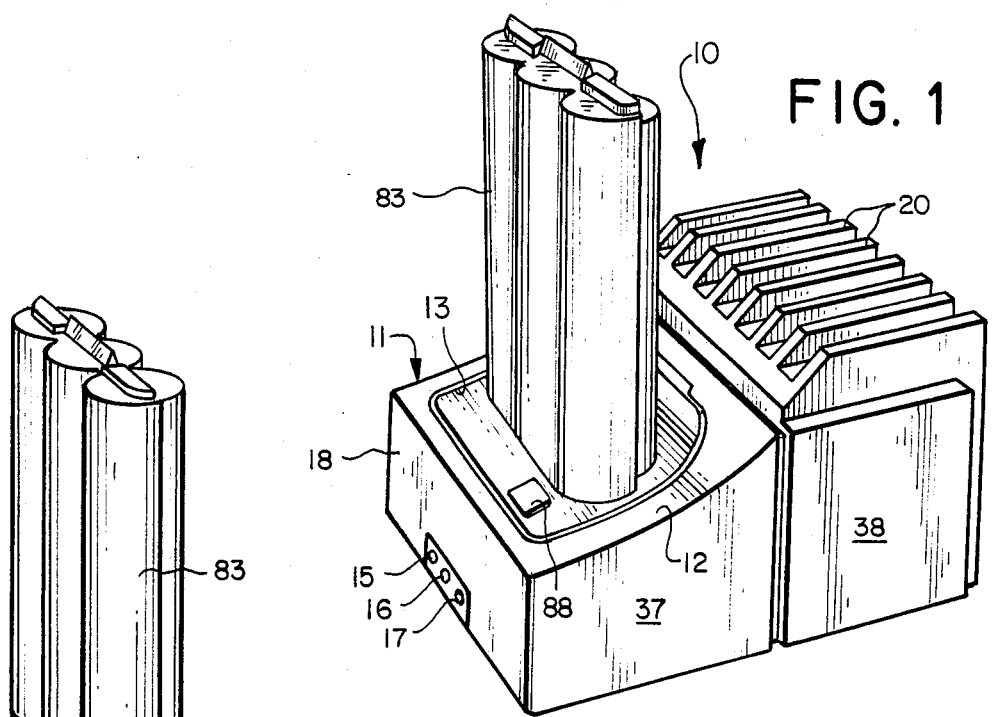
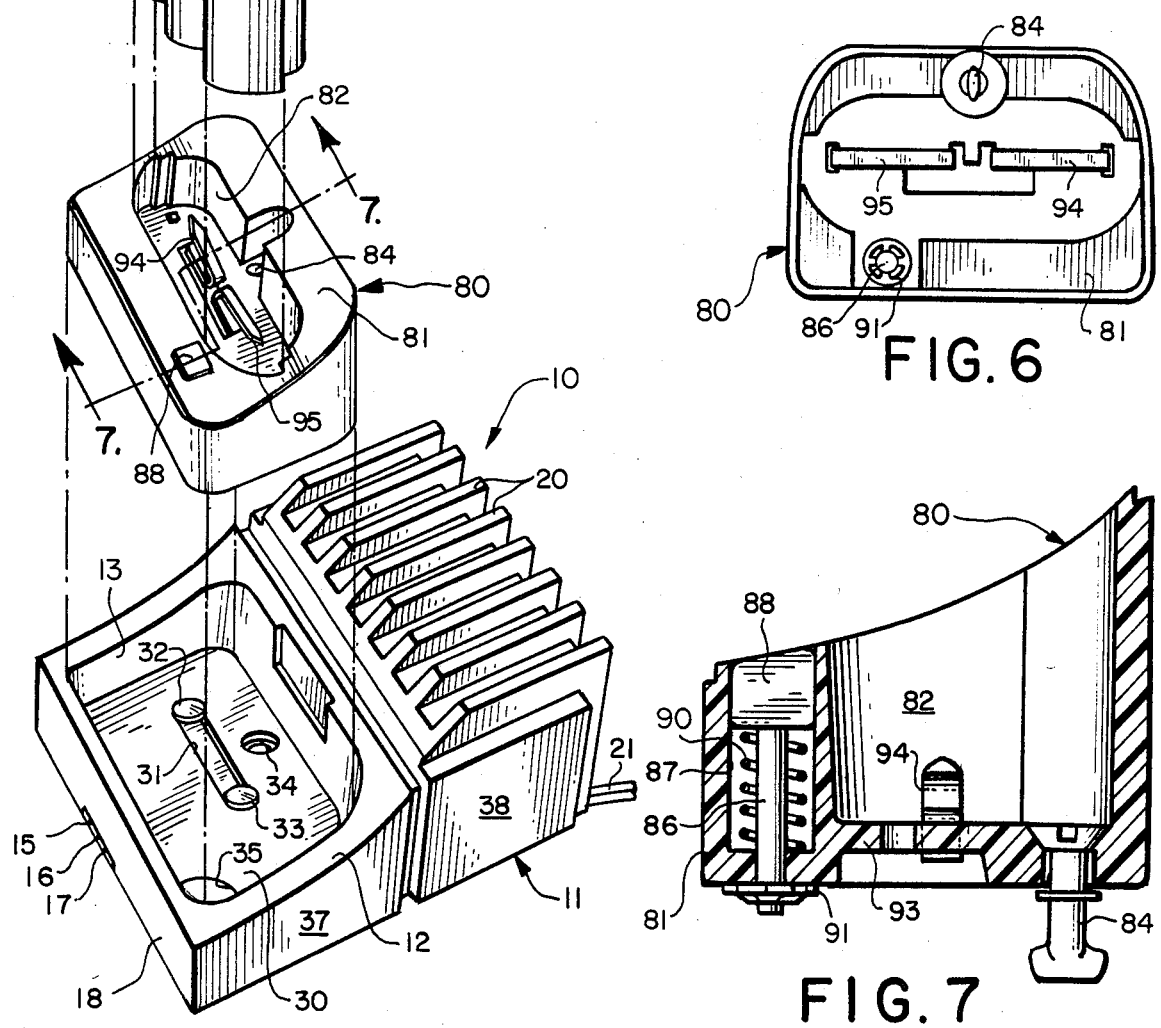
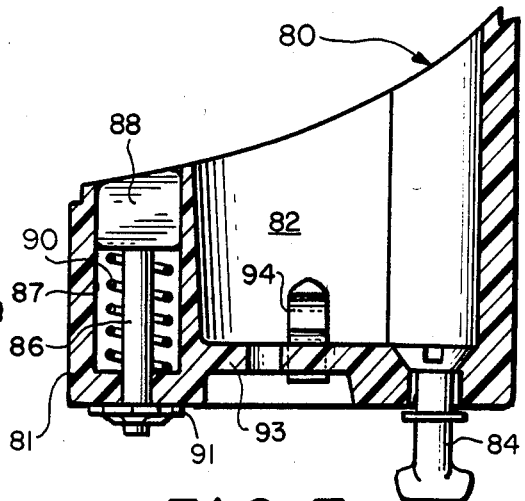

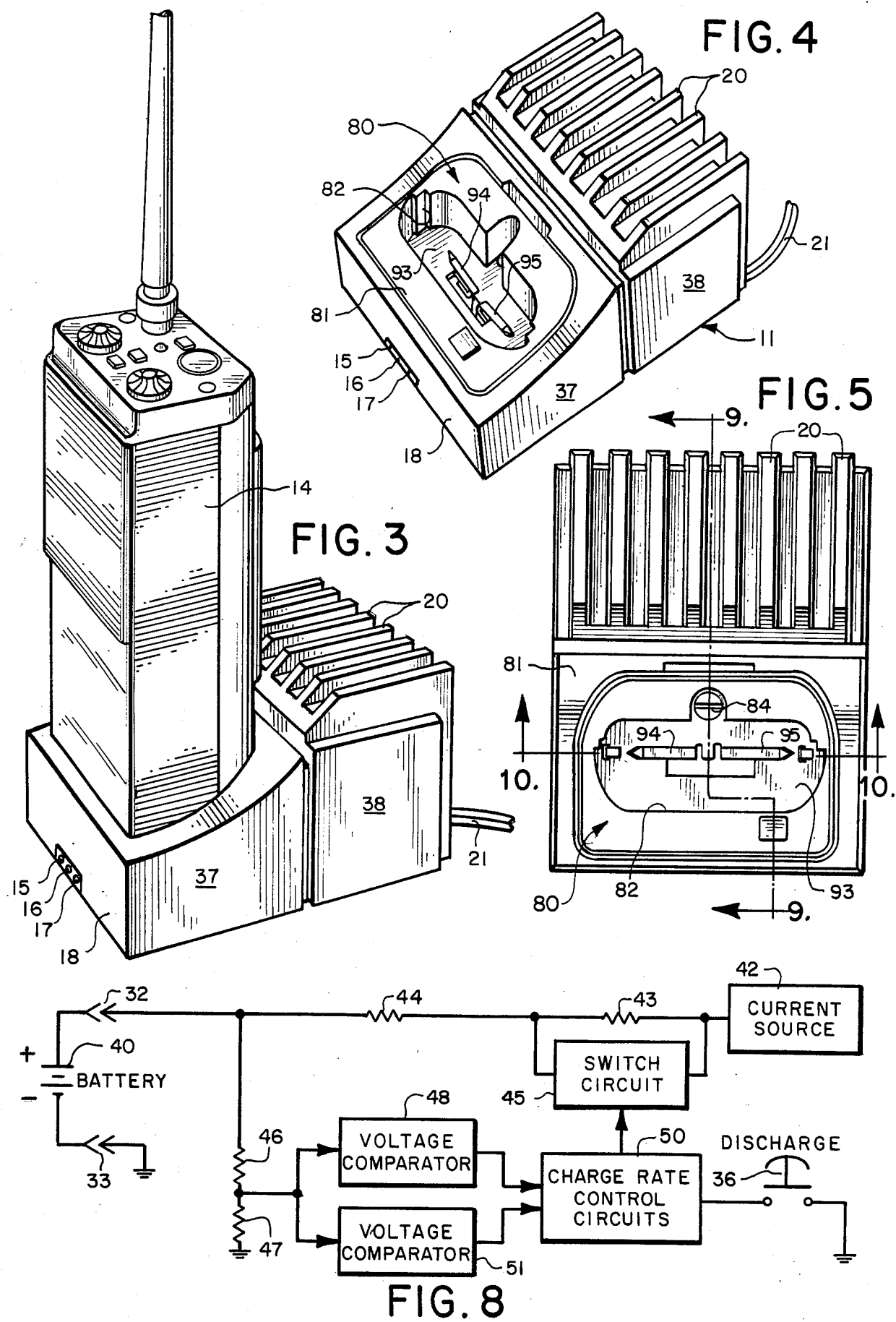

BATTERY CHARGING ADAPTER FOR A BATTERY CHARGER FOR A PORTABLE BATTERY OPERATED TRANSCEIVER

BACKGROUND OF THE INVENTION

The present invention is directed generally to battery chargers, and more specifically to a battery charger system adaptable to provide charging current to both battery powered apparatus and to removable battery packs.

Portable battery-powered devices such as two-way radios, receivers, recorders and test equipment, which may see frequent use over an extended period of time, typically utilize rechargeable batteries which can be recharged after use, thereby avoiding the expense and inconvenience of repeatedly installing new batteries.

When the batteries become depleted, either the battery is removed from the device and installed into a battery charger, or the entire device with battery installed is installed into the battery charger. The charger contains all necessary power supply and control circuitry for bringing the battery up to full charge. Preferably, the recharging procedure takes place initially at a fast charge rate, and then at a trickle charge rate, and is entirely automatic, requiring no attention or control input by the operator. In addition, in the case of nickel cadmium batteries, an additional deep discharge mode may be required, as described in the copending application of Kenneth Fasen, entitled "Battery Charger Having Automatic Mode Control", Ser. No. 529,860, filed concurrently herewith.

One drawback of prior charging systems has been the difficulty of adapting them to charge both batteries installed in apparatus, as well as batteries contained in removable battery packs. The present invention provides a system and adaptor which facilitates quickly handling either of these charging applications.

Accordingly, it is a general object of the present invention to provide a new and improved battery charger.

It is a further object of the present invention to provide a battery charger of improved mechanical construction.

It is a further object of the present invention to provide a battery charger which can be readily configured to charge either a battery powered device, or a battery pack for use in a battery powered device.

SUMMARY OF THE INVENTION

Accordingly, the invention is directed to a battery charger system and adaptor for applying a charging current to a battery-powered device or to a battery pack. The charger system includes a housing defining a receptacle for receiving the battery-powered device. Circuit means within the housing produce a battery charging current. Contact means including a contact in the bottom wall of the recess establish electrical communication between the circuit means and the battery-powered device when installed in the receptacle. An adaptor assembly having a housing dimensioned for installation in the charger receptacle, and having a receptacle for receiving the battery pack, provides electrical communication between the battery pack and the contacts of the charger.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a perspective view of a battery charger system constructed in accordance with the invention showing the installation of a battery pack and adaptor therein.

FIG. 2 is a exploded view of the battery charger system of FIG. 1 showing the adaptor and battery pack thereof.

FIG. 3 is a perspective view of the battery charger system showing the installation of a radio transceiver therein.

FIG. 4 is a perspective view of the battery charger system with the adaptor in place and the battery pack removed.

FIG. 5 is a top plan view of the battery charger system.

FIG. 6 is a bottom plan view of the adaptor showing the electrical contacts and actuator rod thereof.

FIG. 7 is an enlarged cross-sectional view of the adaptor taken along line 7—7 of FIG. 2.

FIG. 8 is a simplified functional block diagram of the battery charging circuit of the battery charger.

DESCRIPTION OF THE PREFERRED EMBODIMENT

Figure 9:
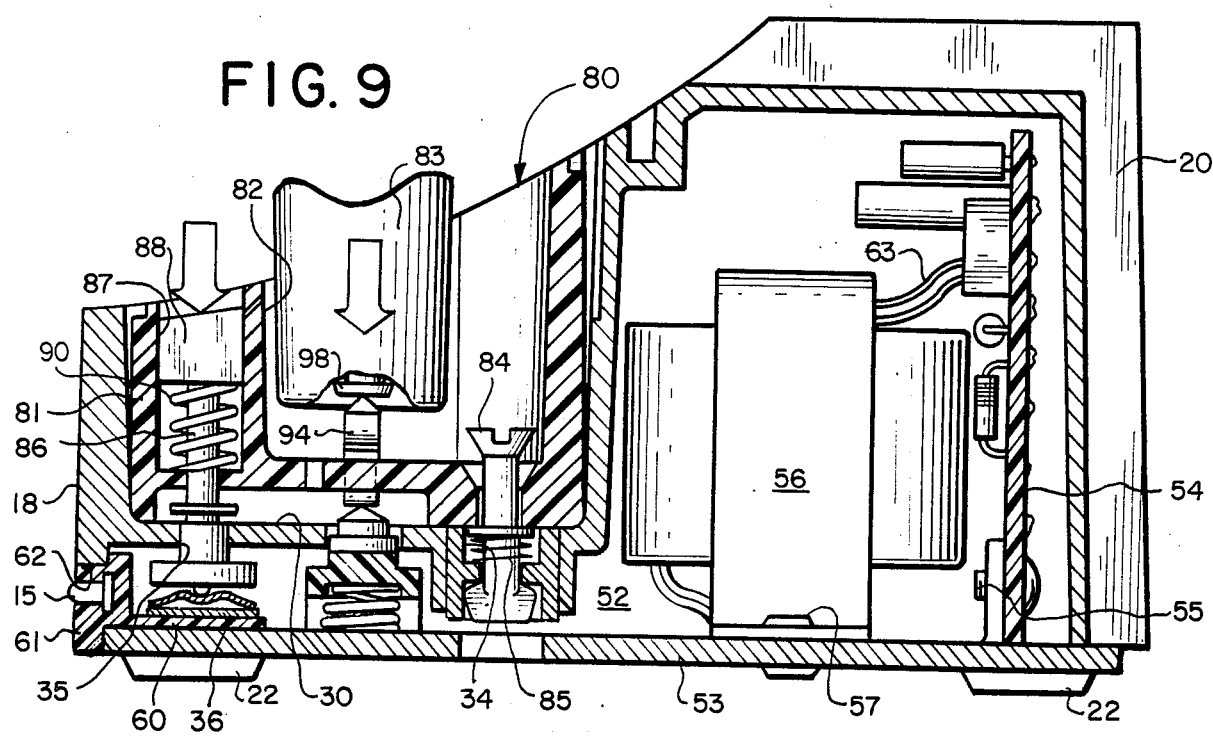
FIG. 9 is an enlarged cross-sectional view of the battery charger taken along 9—9 of FIG. 5.

Referring to the drawings, and particularly to FIGS. 1-5, a battery charger 10 constructed in accordance with the invention is seen to be contained within a housing 11 of generally rectangular construction. The housing, which may be formed of an impact-resistant heat dissipating material, such as aluminum, includes a forwardly and downwardly sloped panel 12 on which a receptacle 13 is provided for receiving a battery-powered device 14 (FIG. 3).

When either the battery-powered device 14, or a battery pack, is installed in receptacle 13, the installed device is positioned generally vertically as shown, facilitating convenient installation and removal from the battery charger. The operating mode of the charger is indicated by LED indicators 15-17 located on a vertical front panel 18 of housing 11. A plurality of fins 20 on the top and rear surfaces of housing 11 are provided to improve heat dissipation from the charger when in use. A line cord 21 may be provided to connect the charger to a conventional alternating current source. A plurality of rubber feet 22 may be provided on the bottom surface of housing 11 to facilitate placement of the battery charger on a flat surface.

To provide for necessary electrical communication between the battery-powered device 14 and the battery charger the bottom wall 30 of receptacle 13 includes a slot-shaped aperture 31 through which a pair of spacedapart electrically-conductive contacts 32 and 33 project into the receptacle. Also provided in the bottom wall 30 is an aperture 34 for receiving a user-rotatable retaining lug (not shown) on a battery pack adaptor. The bottom panel 30 of receptacle 13 also includes an aperture 35 providing access to a pressure-actuated switch 36 (FIG. 9) within the housing, which conditions the charging circuitry of the battery charger to a deep discharge mode.

As shown in FIGS. 1-5, the housing 11 is preferably formed as a single-piece casting, with a front portion generally designated 37 containing the sloped panel 12, the receptacle 13 and the front panel 18, and a second portion generally designated 38 (FIGS. 1, 2, 3 and 5) of generally rectangular construction which includes the heat-dissipating fins.

Basically, as shown in FIG. 8, within battery charger 10 current is supplied to the battery 40 of the battery-powered device 14 by a undirectional current source 42. The output of this current source is applied to battery 40 through a pair of series-connected resistors 43 and 44. A switch circuit 45 is connected in shunt with resistor 43 to enable that component to be effectively removed from the series circuit by establishing a low impedance circuit around the resistor. Contacts 32 and 33 establish electrical contact with battery 40 and allow the device in which the battery is installed to be removed as required.

Battery voltage is sensed by a voltage divider comprising a pair of resistors 46 and 47 connected between the positive terminal of the battery and ground. The juncture of these resistors is connected to a first voltage comparator 48, which compares the battery voltage with a first predetermined reference voltage. If the battery voltage is less than this reference voltage, an output signal is applied to a change rate control circuit 50 to charge the operating mode of the battery charger from a trickle rate to a fast charging rate.

The battery terminal voltage derived at the juncture of resistors 46 and 47 is also applied to a second voltage comparator 51, which functions to compare the battery terminal voltage against a second reference voltage level. In the event that the battery voltage is lower than the second reference level, an output signal is applied to charge rate control circuit 50 to condition that circuit from a discharge mode through a fast charge mode.

Charge rate control circuit 50 can be conditioned to a discharge mode by the pushbutton switch 36, which provides an appropriate control signal to the control circuit. Depending on the operating mode called for by charge rate control circuit 50, an output from this circuit is applied to switch circuit 45 such that resistor 43 is short-circuited when battery conditions call for a fast charge mode. In the event that a trickle charge mode is required, switch circuit 45 is conditioned non-conductive, effectively returning resistor 43 to the charging circuit and reducing the charging current. Resistor 44 is in the circuit at all times to limit the maximum charging current under the fast charge mode.

Thus, battery charger 10 is automatically conditioned to the appropriate one of its trickle charge, fast charge and discharge modes by charge rate control circuit 50 in accordance with the comparisons effected by comparators 48 and 51 and the input provided by switch 36. Reference is made to the copending application of Kenneth Fasen, entitled "Battery Charger Having Automatic Mode Control", Ser. No. 529,860, filed concurrently herewith, for a detailed explanation of the structure and function of the battery charger circuitry.

As shown in FIG. 9, housing 11 comprises a one-piece casting forming an internal compartment 52 within which the circuit components of the battery charger are contained. The compartment 52 is open to the bottom of housing 11. A bottom plate 53 formed of steel or other rigid electrically-conductive material is disposed over the bottom of the housing to enclose compartment 52.

The circuitry of the battery charger is contained on a first printed wiring board 54 mounted in vertical alignment to bottom plate 53 adjacent the rear wall of housing 11. A mounting tab is provided in bottom plate 53 for receiving a machine screw 55 or other appropriate mounting means for circuit board 54. Also provided in the portion 38 of housing 11 is a transformer 56, which is mounted to bottom plate 53 by rivets 57 or other conventional means so as to extend up within the interior of portion 38. Thus arranged, circuit board 54 and transformer 56 are efficiently packaged within the housing portion so as to take advantage of the heat dissipating attributes of the external fins 20.

A second portion of the battery charger circuitry is contained on a second circuit board 60 located in the forward portion 37 of housing 11. This circuit board is mounted parallel to bottom plate 53 and may be attached by cementing or other appropriate means to a molded plastic spacer 61 for supporting LED indicator lights 15-17. Thus situated, spacer 61 serves the dual purpose of insulating circuit board 60 from bottom plate 53, and of providing electrical connections and support to the LED indicator devices. An aperture 62 in the front panel of portion 36 allows the three LED indicators in element 61 to extend into view on the surface of the front panel, as shown in FIGS. 1, 2, 3 and 4.

Circuit board 60, by reason of the underlying support provided by member 61, accommodates the pressure-actuated switch 36. As previously described, this switch is actuated through aperture 35 in bottom wall 30 of receptacle 13 to initiate operation in the deep discharge mode. Necessary electrical connections between switch 36 and LED devices 15-17 are provided by a cable 63 extending between circuit board 60 and circuit board 54.

Figure 10:
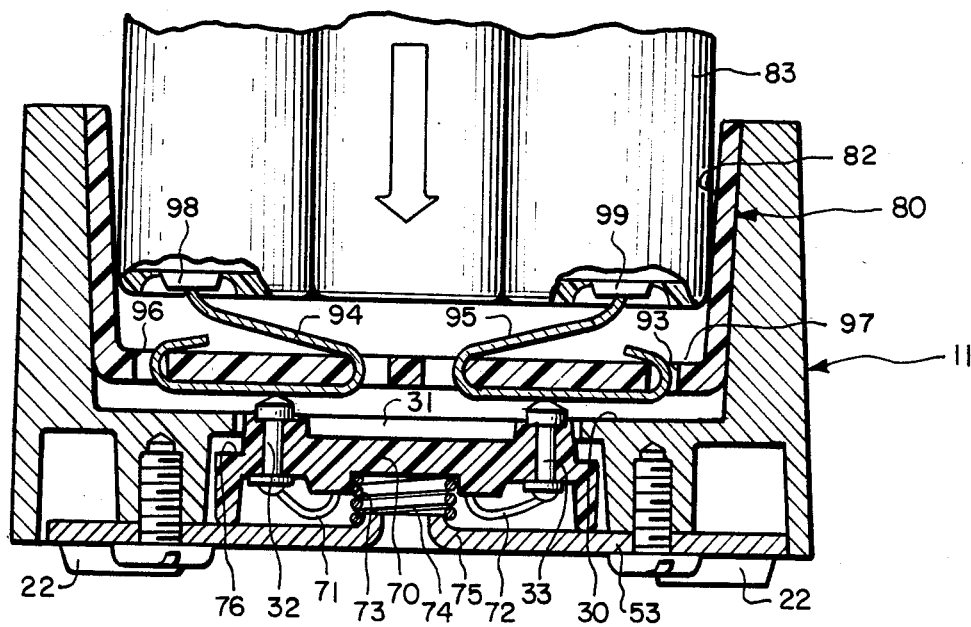
FIG. 10 is an enlarged cross-sectional view taken along line 10—10 of FIG. 5 showing the construction of the electrical contact assembly provided in the system for establishing electrical communication with a battery pack installed in the adaptor receptacle.

The contacts 32 and 33 provided for establishing electrical contact with the battery-powered device 14 are arranged to make contact with complementary contacts on the housing of device 14. Contacts 32 and 33 are seen in FIG. 10 to comprise rivet-like elements carried on a movable electrically non-conductive carrier 70 formed of plastic or other suitable material. Electrical connections are established to contacts 32 and 33 by means of flexible wires 71 and 72, respectively, connected to the bottom surfaces of the contacts as they extend through carrier 70. Carrier 70 includes in an enlarged center portion intermediate contacts 32 and 33, and recess 73 for receiving a helical spring 74. This spring is seated within recess 73 at one end and engages a raised portion 75 of bottom plate 53 at its other end so as to bias the carrier 70 upwardly toward device 14. A projecting portion of the carrier containing contacts 32 and 33 projects through the slot-shaped aperture 31 provided in bottom wall 30, and shoulder portions 76 at either end of the carrier limit the projection.

In accordance with the invention, the battery charger 11 can be quickly and conveniently converted for suppling charging current to a battery pack by installation of an adaptor assembly 80. As shown in FIGS. 1, 2, 4 and 5, this adaptor is installed in the charger receptacle in place of transceiver 14. The adaptor includes a housing 81 which defines a receptacle 82 in its top surface. A battery pack 83 is received in this receptacle in upright vertical alignment, as shown in FIG. 1.

Referring to FIGS. 6 and 7, to secure the adaptor 80 in position, the adaptor includes a conventional twist-lock fitting 84 which engages appropriately formed wall portions of aperture 34. A spring 85 may be provided to assist in actuation of the fitting in a manner well known to the art.

To provide for actuation of the deep discharge mode select switch 36, the adaptor includes, in accordance with one aspect of the invention, a plunger 86 mounted for reciprocative movement within a bore 87 in the adaptor housing 81. The outside (top) end of this plunger includes an operator-accessible actuator button 88 which when pressed displaces the plunger through aperture 35 into operative engagement with switch 36. A spring 90 provided in bore 87 in association with actuator stem 86 returns the stem to its non-actuated state. A C-washer 91 prevents removal of the stem from the housing.

To provide electrical contact with battery pack 83, the adaptor housing 81 includes on the bottom wall 93 of recess 82 a pair of flat resilient spring contacts 94 and 95. These contacts, as best shown in FIG. 10, may be mounted by means of respective pairs of apertures 96 and 97 in the bottom wall 93. When battery pack 82 is installed, as shown in FIGS. 9 and 10, these contacts respectively contact contacts 32 and 33 of the charger and contacts 98 and 99 of the battery pack to establish the requisite connection between the charger and the battery pack.

Thus, a battery charging system is provided which is operable with either a battery-powered device, or with a battery pack. With either arrangement, the resulting connection with the charger is reliable and requires a minimal number of parts, thereby reducing the cost of manufacture of the system.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A battery charging system for supplying charging current to a battery pack for a battery utilization device, comprising;
    a housing having an interior chamber and a device receptacle for receiving the batter utilization device;
    circuit means within said housing for producing a battery charging current having a pressure activated switch for initiating a deep discharge mode, said switch being operator-actuable through an access aperture in the bottom wall of said device receptacle;
    contact means extending into said receptacle for establishing electrical communication between said circuit means and said battery utilization device; and
    adapter means including a housing adapted for installation in said receptacle and defining an alternative receptacle for receiving said battery pack, and including contact means adapted to establish electrical communication between said device receptacle contacts and said battery pack, said adapter means further including actuator means operator-accesible from the exterior of said adapter housing for actuating said switch.

2. A battery charging system as defined in claim 1 wherein said actuation means comprise a push rod mounted for reciprocation within said actuator housing.

3. A battery charging system as defined in claim 2 wherein one end of said push rod is arranged to extend through said access aperture and into operative engagement with said switch upon the application of pressure to the other end thereof.

4. A battery charging system as defined in claim 2 wherein said push rod is mounted for reciprocative movement within said adapter housing, and wherein said adapter means include a spring for biasing said push-rod into a non-actuated state.

5. A battery charging system as defined in claim 1 wherein said adapter housing including means for locking said housing within said device receptacle.

6. A battery charging system as defined in claim 1 wherein said adapter contact means comprise at least one flat spring.

7. A battery charging system as defined in claim 6 wherein said charger receptacle includes a pair of spaced contacts, and said adapter contact means comprise a pair of complementarily positioned flat spring contacts.

8. An adapter for use in conjunction with a battery charger having, a receptacle for receiving a battery utilization device, electrical contacts in the receptacle for enabling the installation of a battery pack in the charger, and a pressure actuated mode selection switch accessible through an aperture in the charger receptacle, comprising;
    an adapter housing dimensioned for installation in the charger receptacle and defining a receptacle for receiving the battery pack;
    contact means within said housing for establishing electrical communication between said electrical contacts in said charger receptacle and the battery pack; and,
    operator actuation means in said adapter housing for facilitating actuation of said switch from the exterior of said adapter housing.

9. An adapter as defined in claim 8 wherein said contact means comprise at least one flat spring contact.

10. An adapter as defined in claim 9 wherein said charger receptacle includes a pair of spaced contacts, and said adapter contact means comprise a pair of complementarily positioned flat spring contacts.

11. An adapter as defined in claim 8 wherein said actuation means comprise a push rod for reciprocation within said actuator housing.

12. An adapter as defined in claim 11 wherein said push rod is spring-biased to a non-actuated position.

13. A battery charging system for supplying charging current to a battery pack for a battery utilization device through device contacts on the housing of the utilization device when the battery pack is mounted therein or directly through the terminals of the battery pack when the battery pack is removed from the utilization device, said system comprising;
    a housing having an interior chamber and a device receptacle for receiving the battery utilization device;

circuit means within said housing for producing a battery charging current;

device receptacle contact means in said receptacle for establishing electrical communication between said circuit means and said device contacts of said battery utilization device; and, adapter means including an adapter housing adapted for installation in said receptacle and defining an alternative receptacle for receiving said battery pack and further including adapter contact means extending into said alternative receptacle for establishing electrical communication between said device receptacle contacts and the terminals of said battery pack.

14. A battery charging system as defined in claim 13 wherein said circuit means include a pressure-actuated switch for initiating a deep discharge mode, said switch being operator-actuable through an access aperture in the bottom wall of said device receptacle, and said adapter means include actuator means operator-accessible from the exterior of said adapter housing for actuating said switch.

15. A battery charging system as defined in claim 14 wherein said actuator means comprise a push rod mounted for reciprocation within said adapter housing.

16. A battery charging system as defined in claim 15 wherein one end of said push rod is arranged to extend through said access aperture and into operative engagement with said switch upon the application of pressure to the other end thereof.

17. A battery charging system as defined in claim 16 wherein said push rod is mounted for reciprocative movement within said adapter housing, and wherein said adapter means include a spring for biasing said push-rod into a non-actuated state.

18. A battery charging system as defined in claim 17 wherein said adapter housing includes means for locking said housing within said device receptacle.

19. A battery charging system as defined in claim 18 wherein said adapter contact means comprise at least one flat spring.

20. A battery charging system as defined in claim 19 wherein said charger receptacle includes a pair of spaced contacts, and said adapter contact means comprise a pair of complementarily positioned flat spring contacts.

* * * * *